(No Model.)
J. D. BARBER.
FEED TROUGH.
No. 371,918. Patented Oct. 25, 1887.
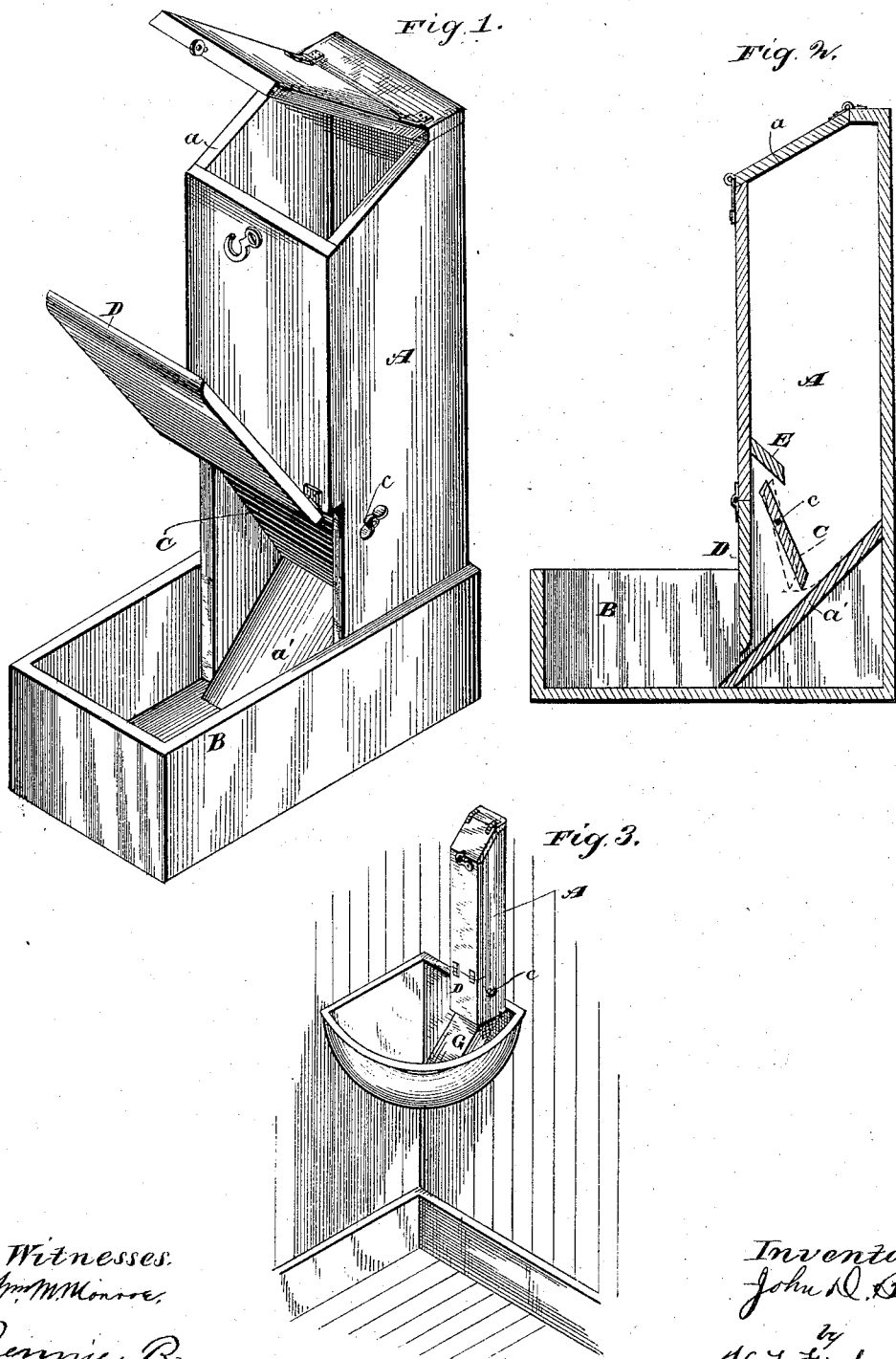

UNITED STATES PATENT OFFICE.

JOHN D. BARBER, OF CLEVELAND, OHIO.

FEED-TROUGH.

SPECIFICATION forming part of Letters Patent No. 371,918, dated October 25, 1887.

Application filed February 14, 1887. Serial No. 227,507. (No model.)

*To all whom it may concern:*

Be it known that I, JOHN D. BARBER, a citizen of the United States, residing at Cleveland, in the county of Cuyahoga and State of Ohio, have invented certain new and useful Improvements in Feed-Troughs; and I do hereby declare that the following is a full, clear, and exact description of the invention, which will enable others skilled in the art to which it appertains to make and use the same.

My invention relates to improvements in feed-troughs for delivering grain to horses or cattle in limited quantities; and the object is to insure a gradual and continuous flow of feed, rapid enough to supply the grain as fast as the animal consumes it, but not rapid enough to allow bolting or cramming the stomach with unmasticated food, as is a common practice with hungry animals.

My invention consists in the construction and combination of parts, as hereinafter described, and more particularly pointed out in the claim.

In the accompanying drawings, Figure 1 is a perspective view of my invention, and Fig. 2 a vertical sectional view of the same. Fig. 3 is a modification showing a round-bottomed metallic trough and a spout leading thereto from the feeder.

A represents an upright box or hopper, into which the required amount of grain to comprise one feed is poured through a covered opening, *a*, in the top. This hopper, as shown in Figs. 1 and 2, rests within one end of a horizontal trough, B, and has an inclined bottom, *a'*, so placed as to slide the contents of the hopper slowly into the trough; but since it is not desired to fill the trough at once with more grain than the animal can take up gradually, the adjustable partition C is placed transversely across the hopper, above the inclined bottom, to regulate the flow of grain or cut it off entirely, as desired. This partition swings upon a pivotal rod, *c*, and may be turned by hand after lifting the swinging door D, covering the lower portion of the hopper. This door serves to protect the partition from the reach of the animal feeding from the box, and as the grain slides down the inclined bottom *a'* and gathers at the foot thereof, it will dam up somewhat behind said door, and the door thus becomes an additional check against the too free flow of the feed. The door also serves to give easy access to this part of the hopper or feed-receptacle.

Any suitable means of adjusting the partition C may be adopted. E is a guard above the partition, to prevent the grain from getting behind it at that point.

In Fig. 3 a modification of the invention is shown adapting it to a metallic corner trough. In this case a shallow inclined spout, G, extends from the hopper down to the bottom of the trough.

In operation the grain sliding past the partition C becomes clogged at the bottom of the inclined bottom, and the quantity so deposited is designed to be so limited that the animal cannot gorge itself therewith. Then as a mouthful is taken away the stock is automatically replenished, and so on until the feed is consumed.

The advantages of this device as a measure of economy are obvious. The grain being fed no faster, then the animal feeding at the trough is able to masticate it thoroughly before swallowing, less grain will be required for a meal than if the grain is quickly swallowed and taken substantially whole and unbroken into the stomach, and the same amount of grain will be much more beneficial to the animal than if fed the old way.

Of course slight changes may be made in the construction of the device without departing from the spirit and scope of my invention.

Having thus described my invention, what I claim, and desire to secure by Letters Patent, is—

In combination, a feed-trough, a feed-receptacle connected with the trough, having an inclined bottom, a pivoted feed-regulating device over said bottom, and a door at the front of the feed-receptacle, pivoted to swing over the lower portion of the inclined bottom, substantially as set forth.

In testimony whereof I hereunto set my hand this 31st day of January, 1887.

JOHN D. BARBER.

Witnesses:
H. T. FISHER,
WM. M. MONROE.